United States Patent Office 3,579,323
Patented May 18, 1971

---

3,579,323
PROCESS FOR THE MANUFACTURE OF A CHLORIDE-FREE HIGH-STRENGTH POTASSIUM AMMONIUM NITRATE PHOSPHATE FERTILISER
Wolfgang Gauster, Linz (Danube), Walter Muller, Leonding, near Linz (Danube), and Alfred Schmidt and Ferdinand Weinrotter, Linz (Danube), Austria, assignors to Osterreichische, Stickstoffwerke Aktiengesellschaft, Linz (Danube), Austria
No Drawing. Filed Sept. 26, 1968, Ser. No. 763,017
Int. Cl. C05b *11/06;* C05c *5/02;* C05d *1/02*
U.S. Cl. 71—35                                              2 Claims

ABSTRACT OF THE DISCLOSURE

Process for the manufacture of chloride-free high-strength potassium ammonium nitrate phosphate fertilisers by reaction of potassium chloride with liquid or gaseous $N_2O_4$ at a temperature of at most 80° C. The reaction medium used is phosphoric acid or a mixture of phosphoric acid and nitric acid. After removal of the nitrosyl chloride formed and neutralising the resulting acid/potassium nitrate suspension with ammonia the mixture is shaped and dried.

---

This invention relates to a process for the manufacture of chloride-free, high-strength NPK fertilisers.

It is known that potassium chloride can be converted into potassium nitrate and nitrosyl chloride, which escapes in the gaseous form, by reaction with liquid and/or gaseous $N_2O_4$, but hitherto usable results have been achieved only if the process is carried out in approximately 70% strength nitric acid as the reaction medium and at a temperature within the range of $-10°$ C. to $+10°$ C. It has furthermore been proposed to carry out a crude phosphate digestion with the potassium nitrate solution containing nitric acid which is produced in the process, and in this manner to manufacture, after neutralisation with ammonia, chloride-free NPK fertilisers. The NPK fertilisers obtainable in this way are however limited as regards their nutrient content and/or the ratio of the nutrient ingredients; the maximum achievable concentrations providing $$N:P_2O_5:K_2O$$

percentage contents of 16.8:10:16.8. The usual commercial ratio $N:P_2O_5:K_2O$ of 1:1:1 or 1:1:1.5 is thus not achieved.

Even if the phosphate content is increased by adding super-phosphate or triple phosphate, though a $N:P_2O_5:K_2O$ ratio of 1:1:1 is then achievable, the limit of the nutrient content is still 12.4:12.4:12.4% or 14.5:14.5:14.5%, because of the high proportion of inert substances. Mixed fertilisers of higher strength cannot be obtained in this manner.

It has now surprisingly been found that the reaction of potassium chloride with liquid or gaseous $N_2O_4$ takes a particularly favourable form if instead of about 70% strength nitric acid, the reaction medium used is phosphoric or a mixture of phosphoric acid and nitric acid, wherein the phosphoric acid or its mixture with nitric acid has a strength of at least 8 N. The temperature of the reaction may be up to 80° C. so that compared to the reaction in pure nitric acid there is the advantage that even when starting with gaseous $N_2O_4$ cooling of the reaction mixture may be dispensed with. This means a considerable saving.

A high-strength chloride-free NPK fertiliser, for example of composition 19:19:19% or 16:16:24%, such as was not obtainable according to the previously known process starting from potassium chloride, can be directly obtained from the potassium nitrate sludge, containing phosphoric acid or phosphoric and nitric acids, which remains after removal of the nitrosyl chloride, by neutralisation with ammonia without other time-consuming measures.

Accordingly the present invention provides a process for the manufacture of a chloride-free high-strength NPK fertiliser, which comprises reacting solid potassium chloride with liquid and/or gaseous dinitrogen tetroxide at a temperature of at most 80° C. in a reaction medium comprising phosphoric acid or a mixture of phosphoric acid and nitric acid containing a predominant proportion of phosphoric acid, and having a strength of at least 8 N, neutralising the resulting acid/potassium nitrate suspension with ammonia after removal of the nitrosyl chloride formed during the reaction, thereby obtaining a potassium ammonium nitrate phosphate fertiliser, and shaping and drying the resulting mixture in a manner which is in itself known.

Optionally the reaction product may be brought to a desired nutrient ratio by adding fertiliser salts.

It is important that the requisite minimum concentration of the phosphoric acid or of the mixture containing phosphoric acid is observed, and because of its low dissociation the phosphoric acid must be counted as a 1.5-basic acid.

The nitrosyl chloride produced in the reaction with the dinitrogen tetroxide is gaseous and escapes during the reaction. In order also to remove residual nitrosyl chloride which may be retained in the sludge, from the reaction mixture, it is advisable to blow these remnants out of the sludge by means of a stream of inert gas such as for example nitrogen or oxygen. The nitrosyl chloride can for example be oxidised with oxygen, the chlorine thereby formed separated off, and the re-formed dinitrogen tetroxide returned to the reaction with potassium chloride.

In order to carry out the process of the invention solid potassium chloride is first suspended in the acid and the dinitrogen tetroxide is then introduced in a liquid or gaseous form. At the same time it is appropriate to ensure good mixing, for example by appropriate stirring. If liquid $N_2O_4$ is used for the reaction the reaction temperature drops ot 5° to 10° C. It is however particularly advantageous to use gaseous $N_2O_4$ which is partially dissociated into $NO_2$. In this case the reaction temperature rises to 70° to 80° C., which increases the solubility of the potassium nitrate formed and hence lowers the viscosity of the reaction mixture. This favours the conversion and in many cases the amount of acid can also be reduced. If solid fertiliser salts are additionally preferably to be added in order to adjust the nutrient content, this addition can be effected before, during or after the neutralisation with ammonia. Examples of suitable salts are ammonium nitrate and ammonium phosphates.

If a mixture of phosphoric acid with nitric acid is used as the reaction medium for the reaction of the potassium chloride with $N_2O_4$ it is not necessary to employ the mixture as such. It is equally possible first to start from a mixture of phosphoric acid and hydrochloric acid of the requisite concentration, with nitric acid being produced in situ from the hydrochloric acid by reaction with the $N_2O_4$, alongside nitrosyl chloride. In such a case the amount of $N_2O_4$ has naturally to be correspondingly increased.

The following examples illustrate the process of the present invention.

EXAMPLE 1

Finely ground potassium chloride is suspended in phosphoric acid containing 30.4% of $P_2O_5$. Liquid dinitrogen tetroxide is introduced into this suspension whilst stirring, whereupon the reaction mixture cools to about 10° C. The raw materials are introduced at the hourly rate of 152 kg. of potassium chloride, 200 kg. of phosphoric acid and 209 kg. of dinitrogen tetroxide.

Nitrosyl chloride which still contains small quantities of dinitrogen tetroxide escapes during the reaction. The remainder of the nitrosyl chloride is subsequently blown out by means of a stream of nitrogen. The practically chloride-free reaction mixture thus obtained is mixed with ammonium nitrate corresponding to an amount of 45.7 kg./hour and is subsequently granulated whilst adding 21.8 kg. of ammonia per hour. After drying, 380 kg. per hour of a chloride-free mixed fertiliser are obtained with a nutrient content of 16.2% N, 16.05% $P_2O_5$ and 24.3% $K_2O$.

EXAMPLE 2

Finely ground potassium chloride is suspended in a mixture of phosphoric acid containing 30.4% of $P_2O_5$ and 60% strength nitric acid, with 95 kg. of potassium chloride, 187 kg. of phosphoric acid and 90 kg. of nitric acid being employed hourly. This mixture is treated with 124 kg. of liquid dinitrogen tetroxide over the course of one hour at 15° C. whilst stirring, whereupon the temperature falls to about 5° C. After the bulk of the nitrosyl chloride formed has escaped, the residual nitrosyl chloride is removed by blowing nitrogen through the reaction mixture. The remaining reaction mixture then contains less than 0.1% of chloride ions. The mixture is neutralised by adding 35 kg. of ammonia per hour, granulated and dried. 297 kg. of a mixed fertiliser with a nutrient content of 19.4% N, 19.2% $P_2O_5$ and 19.3% $K_2O$ are thus obtained hourly.

EXAMPLE 3

95 kg. of potassium chloride are suspended hourly, at 70° C. in a mixture of 187 kg. of phosphoric acid containing 30.4% of $P_2O_5$ and 90 kg. of 60% strength nitric acid. 124 kg. of gaseous dinitrogen tetroxide at a temperature of 25° C. are introduced hourly into this suspension. The temperature of the reaction mixture thereupon rises to 80° C. with the bulk of the solid material going into solution. After the nitrosyl chloride evolution has subsided, the remainder of the nitrosyl chloride is removed from the reaction mixture by a stream of nitrogen and the reaction mixture neutralised by an hourly addition of 35 kg. of ammonia. After granulation and drying 297 kg. of mixed fertiliser containing 19.4% N, 19.2% $P_2O_5$ and 19.3% $K_2O$ are obtained hourly.

EXAMPLE 4

95 kg. of finely ground potassium chloride are suspended hourly in a mixture of 187 kg. of phosphoric acid containing 30.4% of $P_2O_5$ and 84.5 kg. of hydrochloric acid containing 37% by weight of HCl. This mixture is treated with 203 kg. of liquid dinitrogen tetroxide hourly at 15° C. whilst stirring. After evolution of the bulk of the nitrosyl chloride formed, the remaining nitrosyl chloride is expelled from the reaction mixture containing nitric acid and phosphoric acids by introducing a stream of nitrogen, until a residual chloride ion content of less than 0.1% results. After neutralisation with a quantity of ammonia amounting to 35 kg. per hour the fertiliser is granulated and dried. 297 kg. of a mixed fertiliser with a nutrient content of 19.4% N, 19.2% $P_2O_5$ and 19.3% $K_2O$ are thus obtained hourly.

The chloride-free high-strength NPK fertiliser produced according to the present process is applied after the manner in which this type of fertiliser is conventionally used, that is before sowing. Thus, for example, and depending on the soil conditions the best fertilising effect is reached using 550–750 kg./hectare of 16:16:24 fertiliser (potatoes); or 900–1100 kg./hectare 19:19:19 fertiliser (sugar beets); or 900–1100 kg./hectare 19:19:19 fertiliser (corn).

What we claim is:

1. A process for the manufacture of a chloride-free high strength potassium ammonium nitrate phosphate fertiliser which comprises suspending solid potassium chloride in a reaction medium selected from the group of acidic reagents consisting of phosphoric acid, a mixture of phosphoric acid and nitric acid, and a mixture of phosphoric and hydrochloric acids, in said mixtures there being a predominant proportion of phosphoric acid and said reaction medium having at least an effective normality of 8, reacting said suspended potassium chloride with liquid or gaseous dinitrogen tetroxide at a temperature of at most 80° C., removing residual nitrosyl chloride from the acid-potassium nitrate suspension by blowing it out with an inert gas, neutralising the resulting suspension with ammonia and drying the resultant mixture.

2. A process according to claim 1, in which fertiliser salts are added to the reaction mixture before, during or after the neutralisation with ammonia, to form a mixed fertiliser having a desired nutrient ratio.

References Cited

UNITED STATES PATENTS

| | | | |
|---|---|---|---|
| 1,930,664 | 10/1933 | Rosenstein | 23—203N |
| 2,067,931 | 1/1937 | Kniskern et al. | 71—43 |
| 3,290,115 | 12/1966 | Smai et al. | 23—203N |

FOREIGN PATENTS

| | | | |
|---|---|---|---|
| 10,829 | 7/1963 | Japan | 71—36 |

REUBEN FRIEDMAN, Primary Examiner

B. H. LEVENSON, Assistant Examiner

U.S. Cl. X.R.

71—36, 43